United States Patent
Ye et al.

(10) Patent No.: US 9,317,136 B2
(45) Date of Patent: *Apr. 19, 2016

(54) IMAGE-BASED OBJECT TRACKING SYSTEM AND IMAGE-BASED OBJECT TRACKING METHOD

(71) Applicant: Cywee Group Limited, Road Town, Tortola (VG)

(72) Inventors: Zhou Ye, Foster City, CA (US); Sheng-Weng Jeng, Tainan (TW); Chih-Ming Chang, New Taipei (TW); Hsin-Wei Hsiao, New Taipei (TW); Yi-Chia Hsu, Taipei (TW); Ying-Ko Lu, Taoyuan County (TW)

(73) Assignee: UL See Inc., Taipei (TW)

( * ) Notice: Subject to any disclaimer, the term of this patent is extended or adjusted under 35 U.S.C. 154(b) by 156 days.

This patent is subject to a terminal disclaimer.

(21) Appl. No.: 14/152,107

(22) Filed: Jan. 10, 2014

(65) Prior Publication Data

US 2014/0191951 A1    Jul. 10, 2014

Related U.S. Application Data

(63) Continuation-in-part of application No. 14/093,035, filed on Nov. 28, 2013, now Pat. No. 9,182,813.

(60) Provisional application No. 61/751,241, filed on Jan. 10, 2013.

(51) Int. Cl.
| | |
|---|---|
| *G06K 9/00* | (2006.01) |
| *G06F 3/03* | (2006.01) |
| *G06T 7/20* | (2006.01) |
| *G06T 11/00* | (2006.01) |
| *G06K 9/46* | (2006.01) |

(52) U.S. Cl.
CPC ............. *G06F 3/0304* (2013.01); *G06T 7/204* (2013.01); *G06T 11/00* (2013.01); *G06K 9/00228* (2013.01); *G06K 9/4652* (2013.01); *G06T 2207/10024* (2013.01)

(58) Field of Classification Search
CPC ............... H04N 2005/4432; H04N 21/42204; G06K 19/07749; G06K 19/07703; G06T 2207/10024
USPC .................. 382/100, 103, 155–161; 345/156
See application file for complete search history.

(56) References Cited

U.S. PATENT DOCUMENTS

| | | | |
|---|---|---|---|
| 6,795,068 B1 * | 9/2004 | Marks ................... | G06F 3/0304 345/419 |
| 2010/0144436 A1 * | 6/2010 | Marks .................... | G06F 3/017 463/36 |
| 2010/0303297 A1 * | 12/2010 | Mikhailov ............. | A63F 13/06 382/103 |
| 2013/0004622 A1 * | 1/2013 | Alimenti ............. | A23G 3/0027 426/91 |
| 2013/0201105 A1 * | 8/2013 | Ptucha .................... | G06F 3/017 345/158 |
| 2013/0287294 A1 | 10/2013 | Ye et al. | |

* cited by examiner

*Primary Examiner* — Stephen R Koziol
*Assistant Examiner* — Shaghayegh Azima
(74) *Attorney, Agent, or Firm* — Alan D. Kamrath; Kamrath IP Lawfirm, P.A.

(57) ABSTRACT

An image-based object tracking system and an image-based object tracking method are provided. The image-based object tracking system includes an object, a camera, a computing device, and a display device. A color stripe is disposed on the surface of the object. The color stripe divides the surface of the object into a first section and a second section. The camera is configured to capture real-time images of the object. Further, the object tracking algorithm is stored in the computing device. The display device includes a display screen and is electrically connected to the computing device, and the display screen is configured to display the real-time images of the object. By using the image-based object tracking system provided in the invention, the object can be tracked accurately and efficiently without interference with the image of the background.

12 Claims, 20 Drawing Sheets

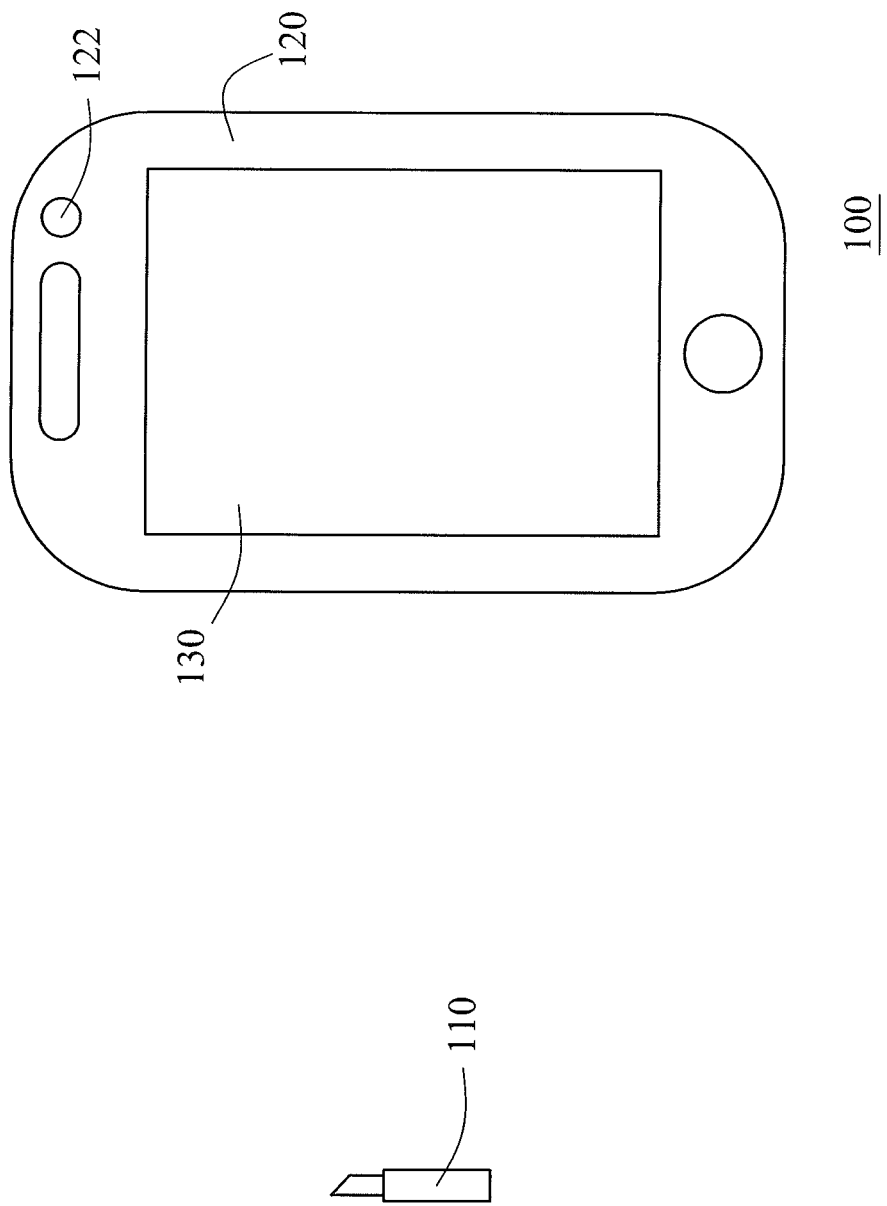

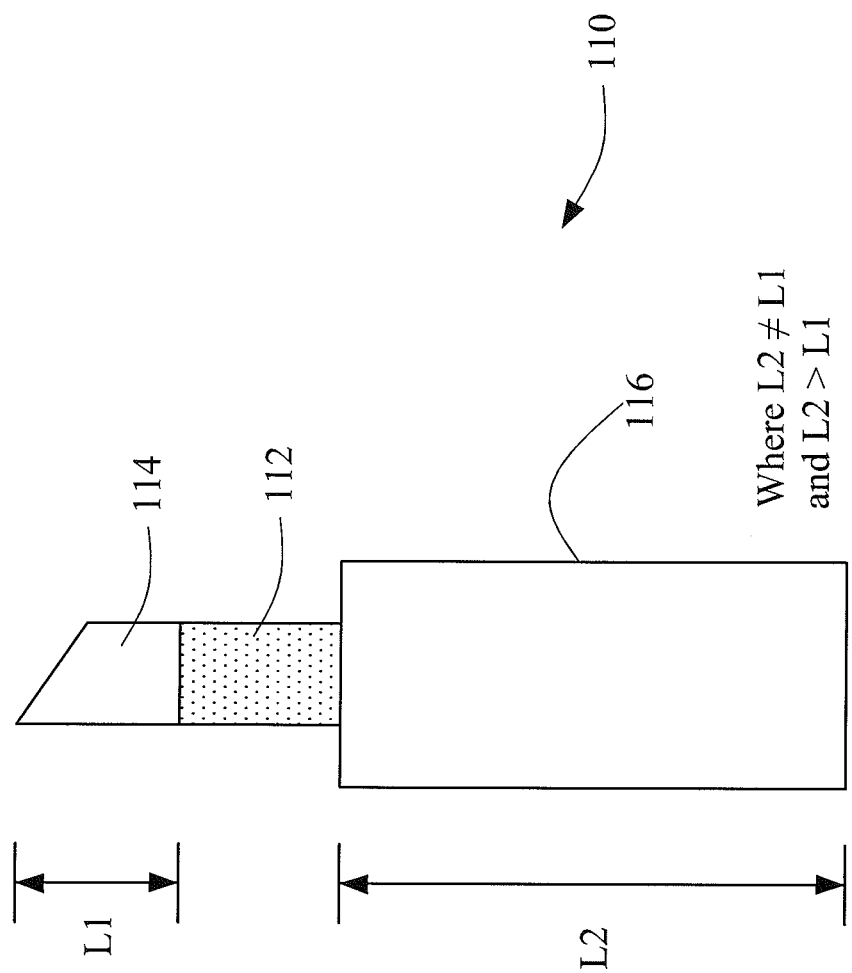

Roll rotation

Pitch rotation

Yaw rotation

IMAGE-BASED OBJECT TRACKING SYSTEM AND IMAGE-BASED OBJECT TRACKING METHOD

CROSS REFERENCE

This application is a continuation in-part of an application Ser. No. 14/093,035, filed on Nov. 28, 2013, now pending, which claims the priority benefit of U.S. provisional application No. 61/751,241, filed on Jan. 10, 2013. The entirety of the above-mentioned patent application is hereby incorporated by reference herein and made a part of this specification.

FIELD OF THE INVENTION

The present invention relates to an image-based object tracking system and an image-based object tracking method. In particular, the present invention relates to an image-based object tracking system and an image-based object tracking method which can more effectively track the image of the object by disposing a color stripe on an object to be tracked.

BACKGROUND OF THE INVENTION

A growing trend in the electronic gaming industry is to develop games and controllers that increase the real-time 3D spatial interaction between a game player and an electronic gaming system. One method of accomplishing a richer real-time interactive experience is to use game controllers whose movement and motion are tracked by the electronic gaming system in order to track the game player's movements and use these movements as control or command inputs for game play. Traditional method of object tracking used on tracking the movement and motion of the game controllers are achieved via embedded motion sensors and may have a singular distinguishable color detecting region disposed on the game controller. However, the singular colored color detecting region of the game controller fails to provide multi-color segmentation functionality, and is thereby subjected to color blending problem when encountering color interference from the image background. Therefore, there is room for improvement in tracking the game controller or an object more accurately and effectively.

SUMMARY OF THE INVENTION

It is therefore one of the objectives of the present invention to provide an image-based object tracking system and an image-based object tracking method, to solve the above-mentioned problems in the prior art.

According to one aspect of the present invention, an image-based object tracking system is provided. The image-based object tracking system includes an object, a camera, a computing device, and a display device. A color stripe is disposed on a surface of the object. The color stripe divides the surface of the object into a first section and a second section. The camera is configured to capture real-time images of the object. Further, the object tracking algorithm is stored in the computing device. The display device comprises a display screen and is electrically connected to the computing device, and the display screen is configured to display the real-time images of the object. When the computing device starts the operation of the object tracking algorithm, the computing device performs the following steps:

(i) checking whether the color characteristics of the object stored in a database of the computing device, otherwise starting a step of color learning to store the color characteristics of the object in the database of the computing device;

(ii) creating an object tracking window; and (iii) when the image of the object enters into the object tracking window, tracking the position of the object based on the color characteristics of the object stored in the database.

In one embodiment of the present invention, in the step (i), the step of color learning comprises the following steps. First, a color learning window is shown on the display screen. Then, the object is moved so as to make the image of the object being located in the color window. Thereafter, color characteristics of the object is extracted and stored in the database.

In one embodiment of the present invention, the step (ii) comprises the following steps. First, a face tracking step is executed so as to track a user's face. Then, an object tracking window circling the user's face is created. A length and a width of the object tracking window are greater than a length and a width of the user's face, respectively.

In one embodiment of the present invention, a length of the first section is less than a length of the second section, and the step (iii) comprises the following steps. First, based on the color characteristics of the object stored in the database, the image of the object and the image of a background in which the object exists are split. Then, the first section and the second section of the object are labeled, so as to label the second section as a body and the first section as a tip. Thereafter, the first section and the second section are labeled. After that, the position of the object is tracked.

In one embodiment of the present invention, the object further comprises a motion sensor and a first wireless transmission unit, and the computing device further comprises a second wireless transmission unit. The first wireless transmission unit is configured to transmit data generated by the motion sensor to the second wireless transmission unit.

According to one aspect of the present invention, an image-based object tracking method is provided. The image-based object tracking method comprises the following steps:

(a) capturing real-time images of an object by a camera;

(b) checking whether color characteristics of the object is stored in a database of a computing device, otherwise starting a step of color learning to store the color characteristics of the object in the database of the computing device, wherein a color stripe is disposed on the surface of the object, the color stripe divides the surface of the object into a first section and a second section;

(c) creating an object tracking window; and (d) when the image of the object enters into the object tracking window, tracking the position of the object based on the color characteristics of the object stored in the database.

By using the image-based object tracking system provided in the invention, the object can be tracked accurately and efficiently without interference with the image of the background.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1A shows a schematic diagram of an embodiment of an image-based object tracking system of the present invention.

FIG. 2 shows a schematic diagram of the object.

DETAILED DESCRIPTION OF PREFERRED EMBODIMENTS

Figure 1B:
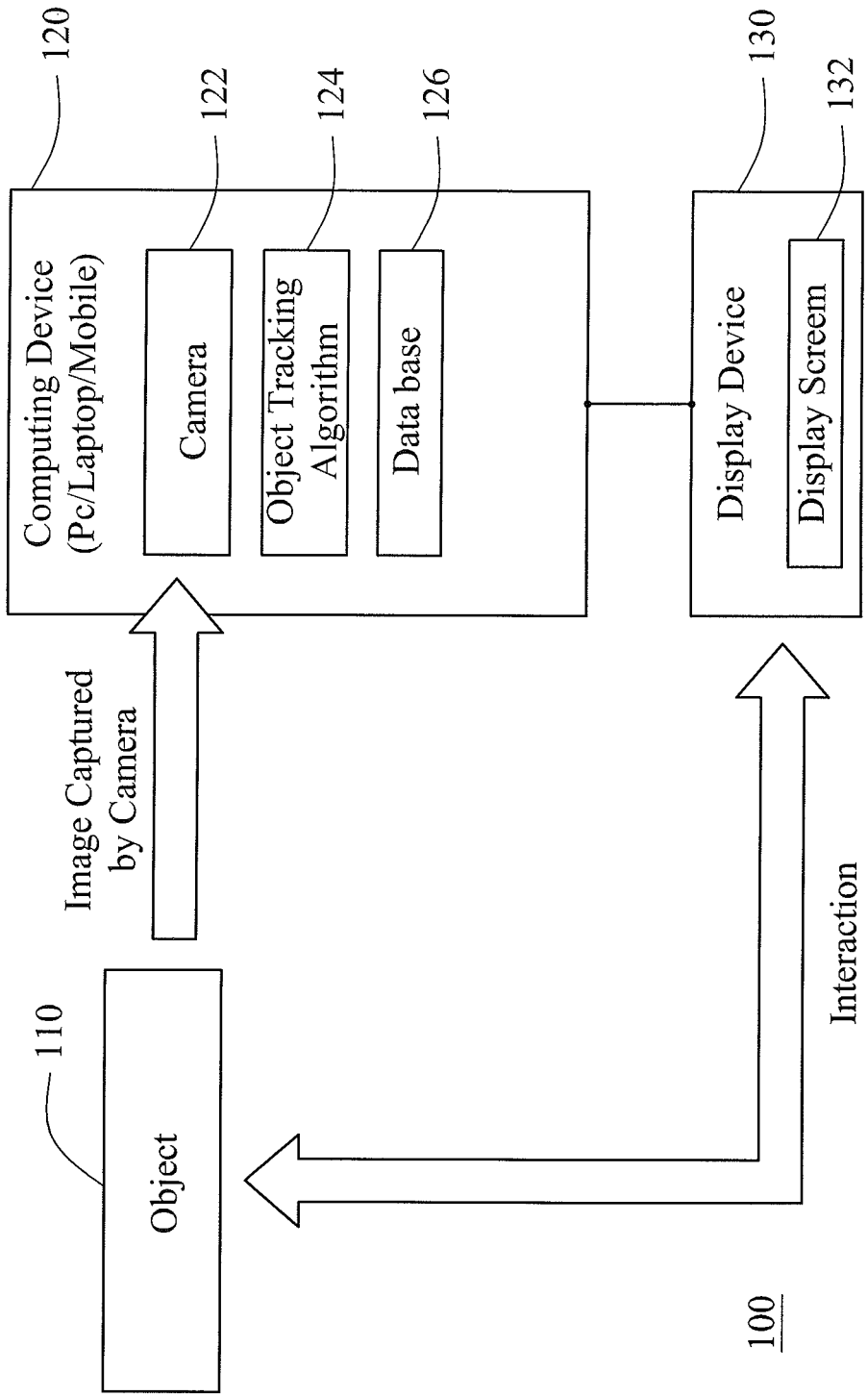
FIG. 1B shows a block diagram of an embodiment of the image-based object tracking system of the present invention.

Please refer to FIG. 1A and FIG. 1B, FIG. 1A shows a schematic diagram of an embodiment of an image-based object tracking system of the present invention, and FIG. 1B shows a block diagram of an embodiment of the image-based object tracking system of the present invention. In the present embodiment, the image-based object tracking system 100 includes an object 110, a camera 122, a computing device 120, and a display device 130. In the present embodiment, the camera 122, the computing device 120, and the display device 130 are integrated as a tablet. However, in other embodiments, the camera, the computing device, and the display device can be provided separately. For example, the computing device can be a host of the personal computer, and the camera and the display device can be externally connected to the host. Or, the camera, the computing device, and the display device can be integrated as a mobile phone.

Please also refer to FIG. 2, FIG. 2 shows a schematic diagram of the object. The object 110 is a long rod-shaped object, and a color stripe 112 is disposed on the surface thereof. In the present embodiment, the surface of the object 110 is rendered in a single color except for the color stripe 112. FIG. 2 shows the surface of the object 110 is divided into a first section 114 and a second section 116 by disposing the color stripe 112. Furthermore, the length L1 of the first section 114 is smaller than the length L2 of the second section 116. In the present embodiment, the color stripe 112 is painted or coated on the surface of the object 110, but the color stripe 112 can also be a tape adhered on the surface of the object 110, and the color of the tape is different from the color of the surface of the object 110.

Please refer to FIGS. 1A and 1B, the camera 122 is configured to capture real-time images of the object 110, and the images of this object 110 is instantly displayed on the display screen 132 of the display device 130. In addition, an object tracking algorithm 124 is stored in the computing device 120. With this object tracking algorithm 124, the computing device 120 can process the real-time image of the object 110. In addition, the computing device 120 also includes a database 126, the database 126 is configured to store information related to the object 110, for example: color characteristics of the object 110.

Figure 3:
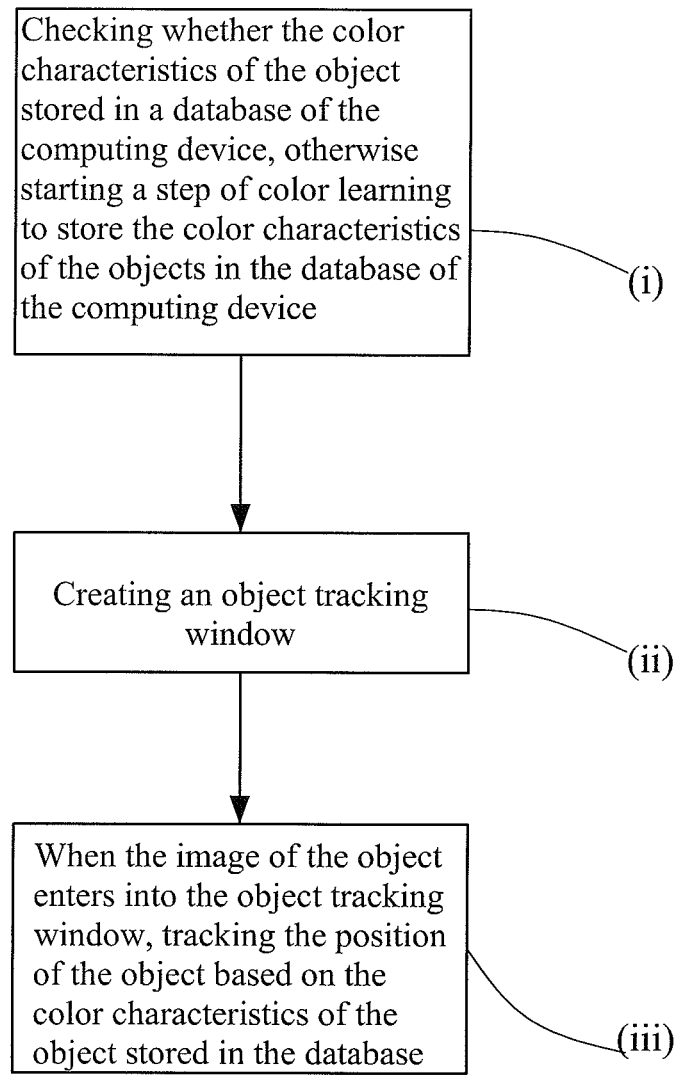
FIG. 3 shows a flowchart of the process of the object tracking algorithm.

Please refer to FIG. 3, FIG. 3 shows the process of the object tracking algorithm. First, in step (i), checking whether the color characteristics of the object 110 stored in a database 126 of the computing device 120, otherwise starting a step of color learning to store the color characteristics of the object 110 in the database 126 of the computing device 120. Then, in step (ii), an object tracking window 132b (shown in FIG. 7) is created. Then, in step (iii), when the image of the object 110 enters into the object tracking window 132b, tracking the position of the object 110 based on the color characteristics of the object 110 stored in the database 126. Hereinafter, the steps (i)~step (iii) will be described in more detail.

Figure 4:
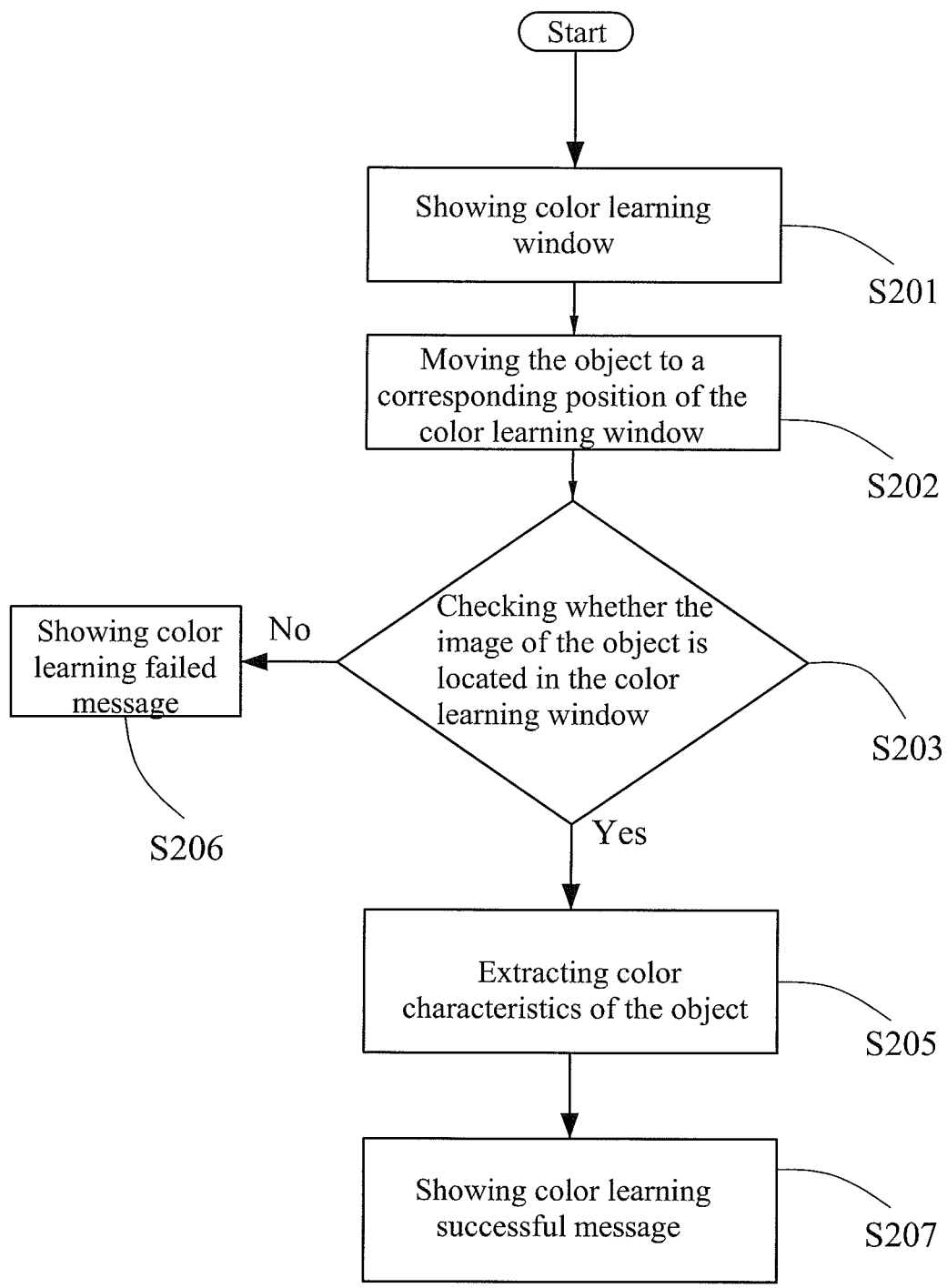
FIG. 4 shows a flowchart of the color learning steps.
Figure 5A:
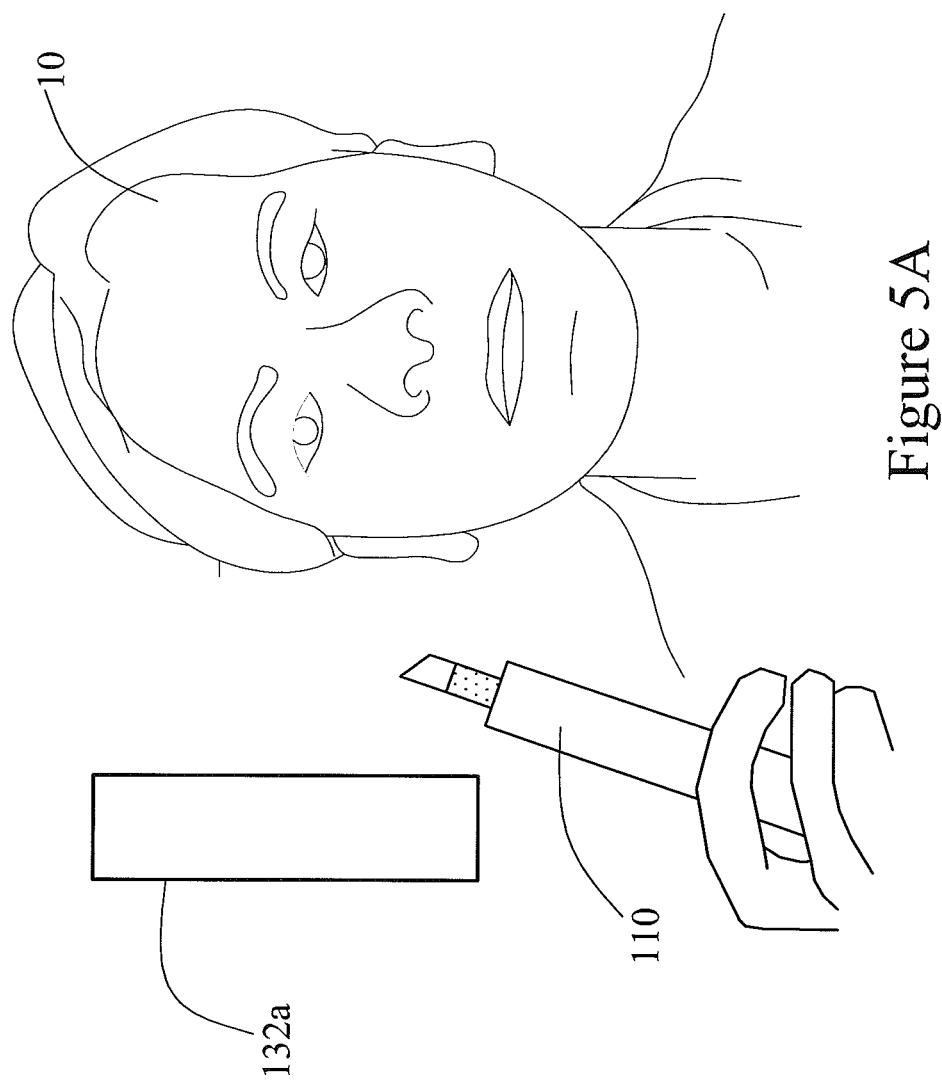
FIG. 5A and FIG. 5B show the image shown on the display screen during the color learning.
Figure 5B:
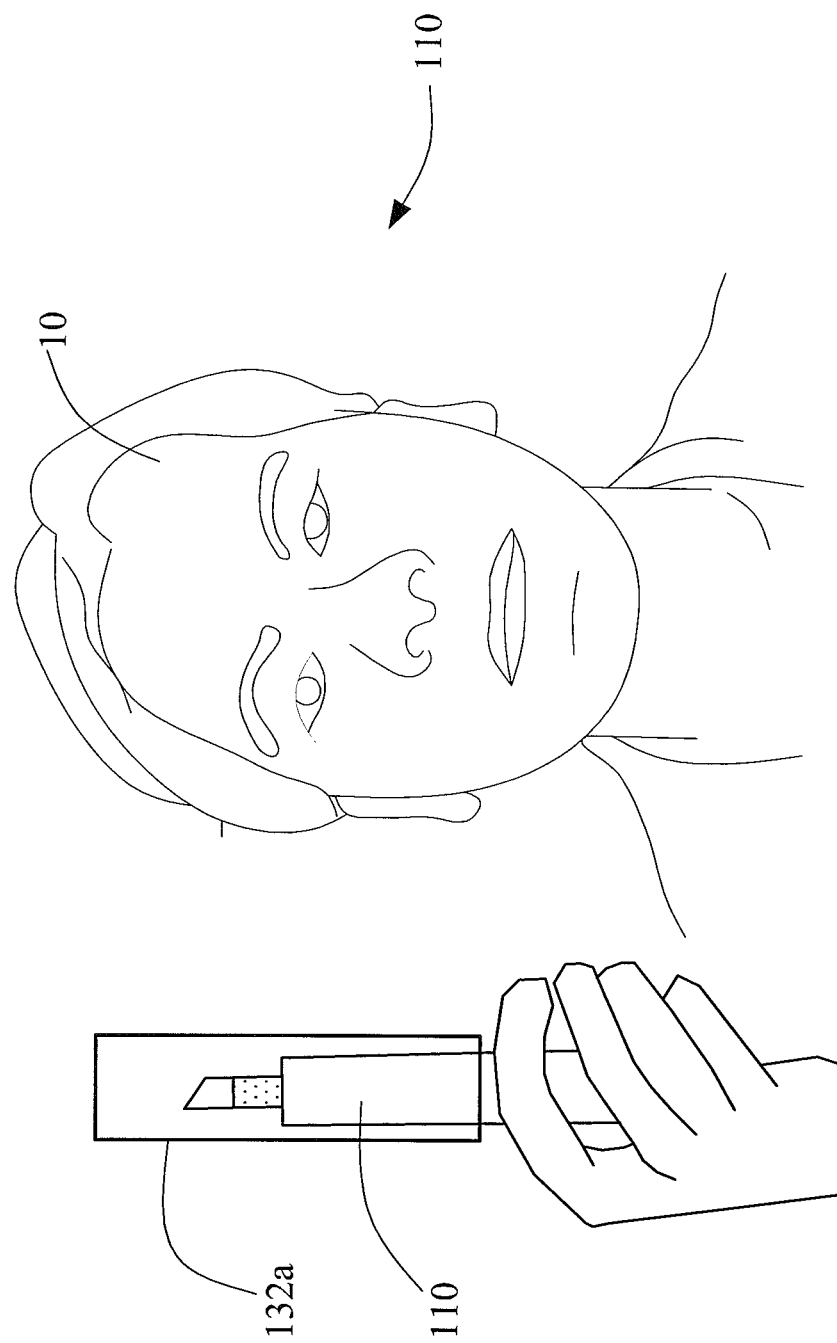

Please refer to FIG. 4, FIG. 5A, and FIG. 5B, FIG. 4 shows a flowchart of the color learning steps, FIG. 5A and FIG. 5B show the image shown on the display screen during the color learning. First, the step S201 is executed, and a color learning window 132a (shown in FIG. 5A) is created and shown in the display 132. Then, the step S202 is executed, the user 10 moves the object 110 to a corresponding position of the color learning window 132a, in other words to make the image of the object 110 be located in the color learning window 132a (shown in FIG. 5B). After that, the step S203 is executed, checking whether the image of the object 110 is positioned/located in the color learning window 132a or not, if the image of the object 110 is not positioned/located in the color learning window 132a the step S204 is executed, otherwise the step S206 is executed. In the step S206, the color learning failed message is displayed on the display screen 132, at this time it may be required to repeat the step S202, so as to recognize the image of the object 110 again. In the step S205, the color characteristics of the object 110 is extracted and stored in the database 126. In the present embodiment, the color characteristics of the object 110 are stored as an image histogram of a data type in the database 126. Then the step S207 is executed, the color learning successful message is displayed on the display screen 132.

Figure 6:
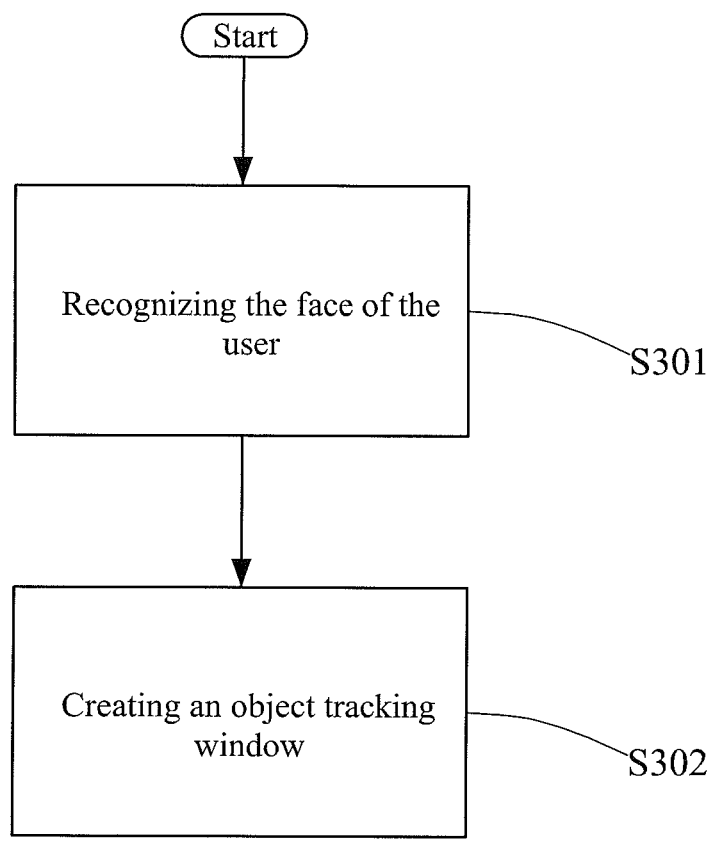
FIG. 6 shows a flowchart of the steps of creating the object tracking window.
Figure 7:
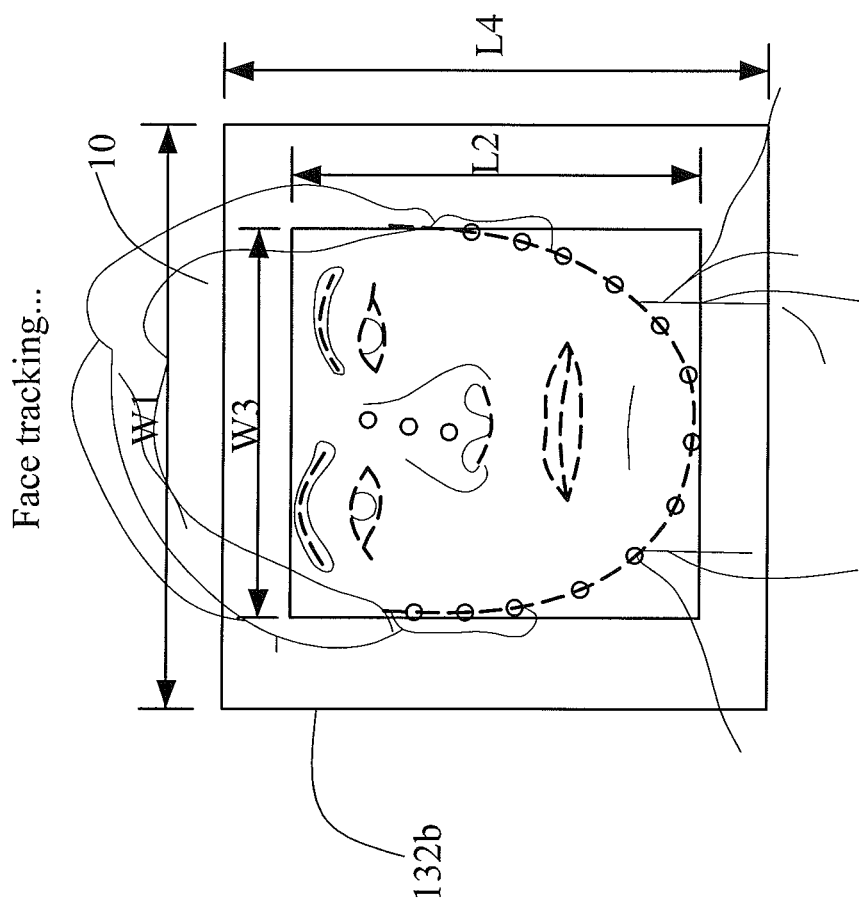
FIG. 7 shows the image shown on the display screen when the step of creating an object tracking window is executed.

In the following, the step of creating an object tracking window is described. Please refer to FIG. 6 and FIG. 7, FIG. 6 shows a flowchart of the steps of creating the object tracking window, and FIG. 7 shows the image shown on the display screen when the step of creating an object tracking window is executed. First, the step S301 is executed, the face of the user 10 is recognized and tracked, and the size of the face of the user 10 is measured. For example, in the present embodiment, the width of the face of the user 10 is W3, and the length of the face is L3. In the step S301, the characteristics of the face of the user 10 may be further recognized or labeled in more detail, for example these characteristics are: the eyes, nose, mouth, face boundary and the like. In the present embodiment, the face tracking method is for example described in patent application Ser. No. 13/873,402. After that, the step S302 is executed so as to create an object tracking window 132b. FIG. 7 shows that the face of the user 10 is circled by the object tracking window 132b, and a length L4 and a width W4 of the object tracking window 132b are greater than the length L3 and the width W3 of the face of the user 10, respectively.

Figure 8:
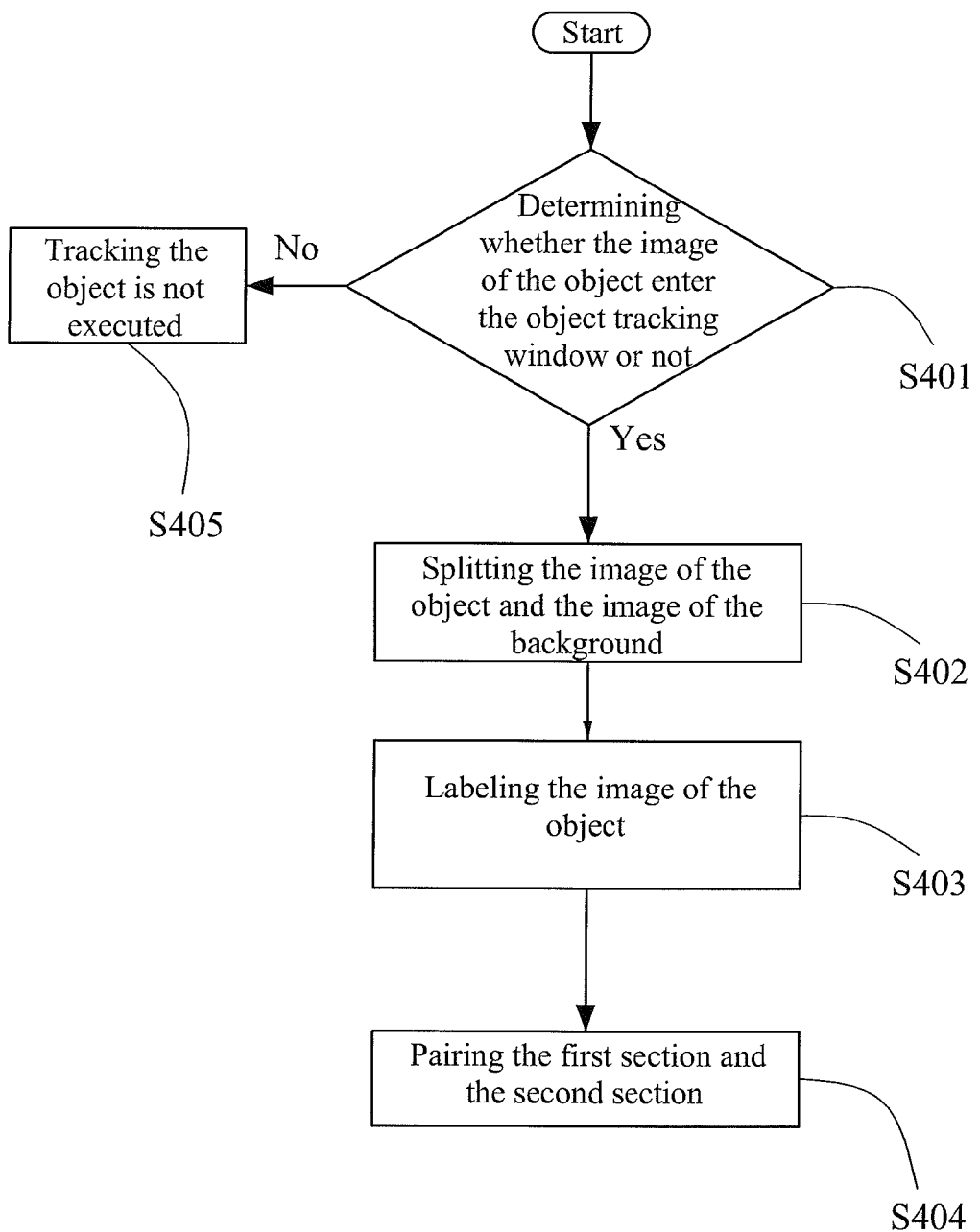
FIG. 8 shows a flowchart of the steps how the computing device tracking the object.
Figure 9:
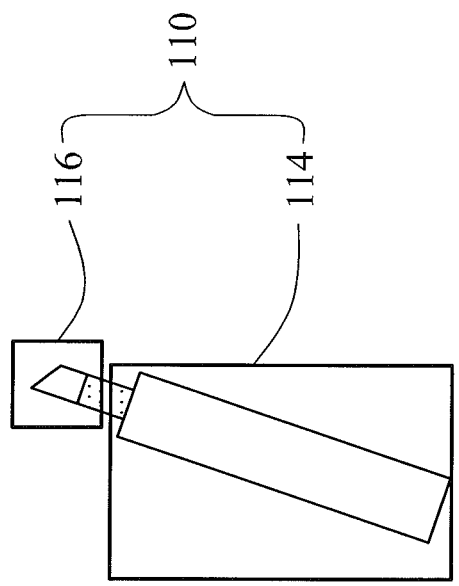
FIG. 9 shows the image shown on the display screen when the image of the background is filtered.
Figure 10A:
FIGS. 10A~10G show the application embodiment of the image-based object tracking system of the present invention.
Figure 10B:
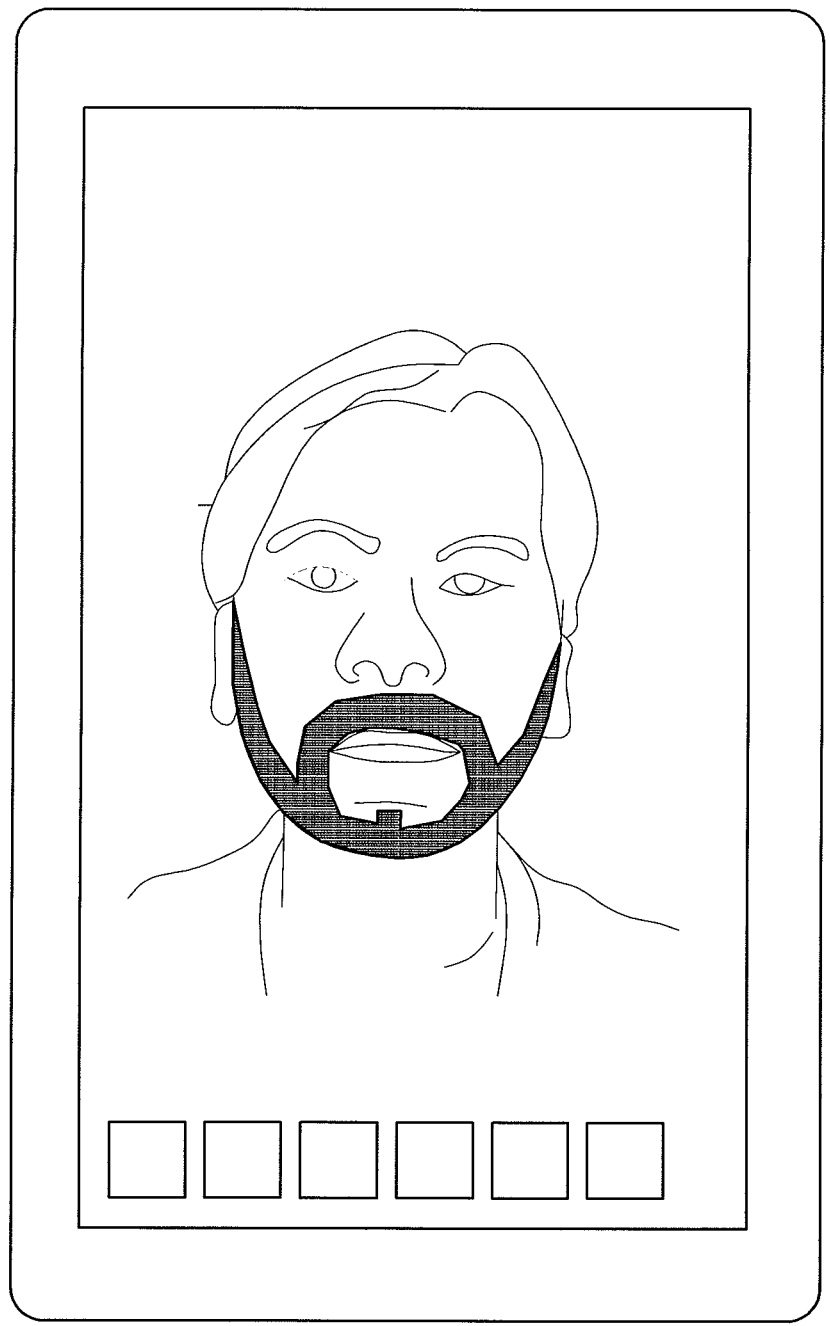
Figure 10C:
Figure 10D:
Figure 10E:
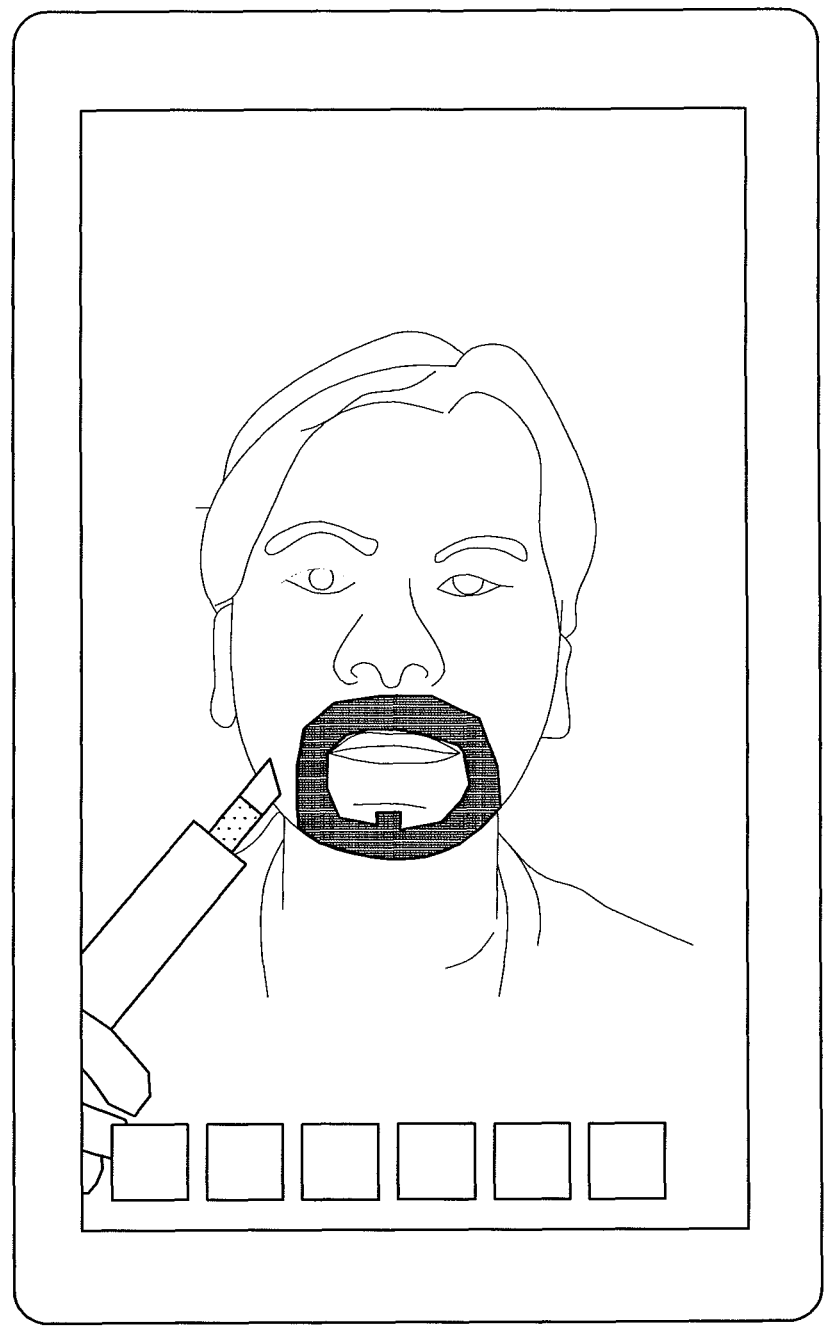
Figure 10F:
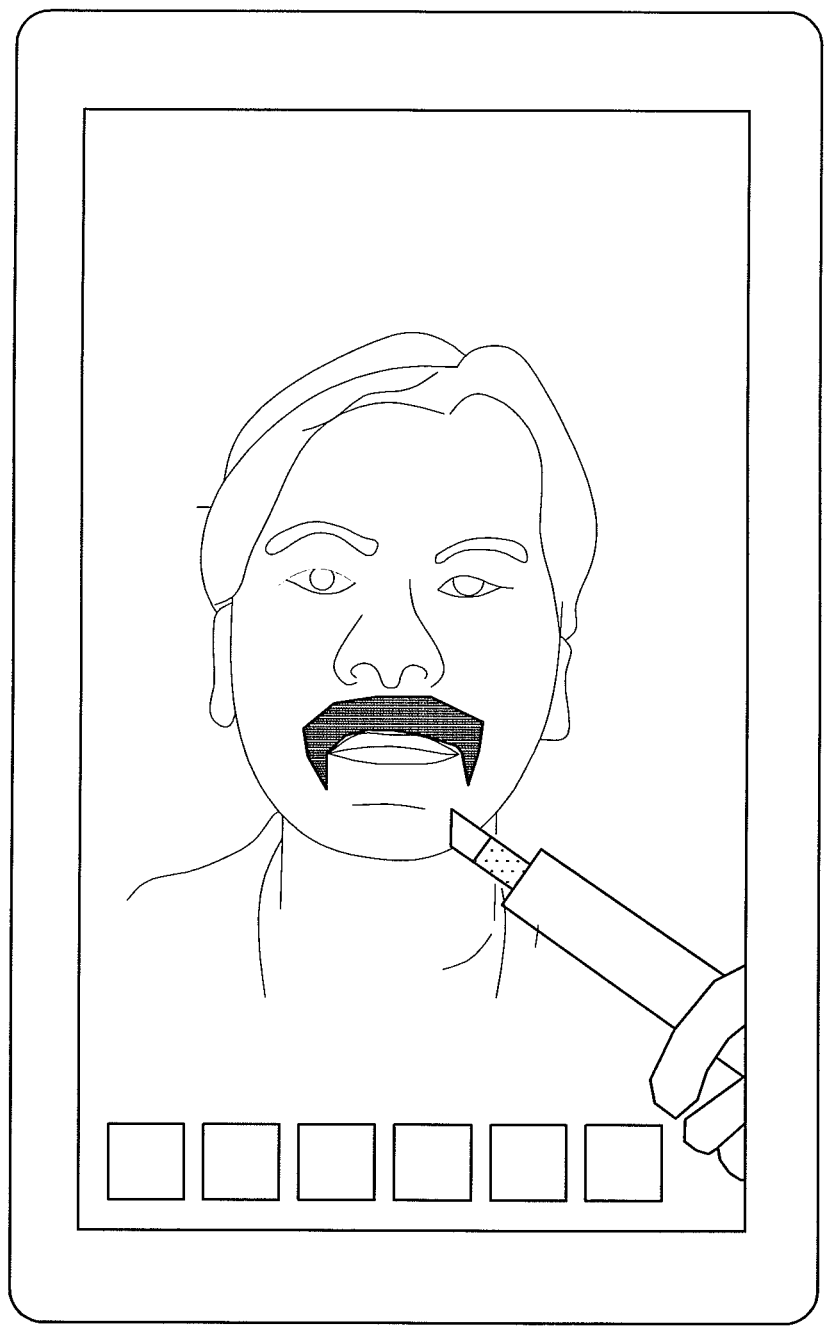
Figure 10G:
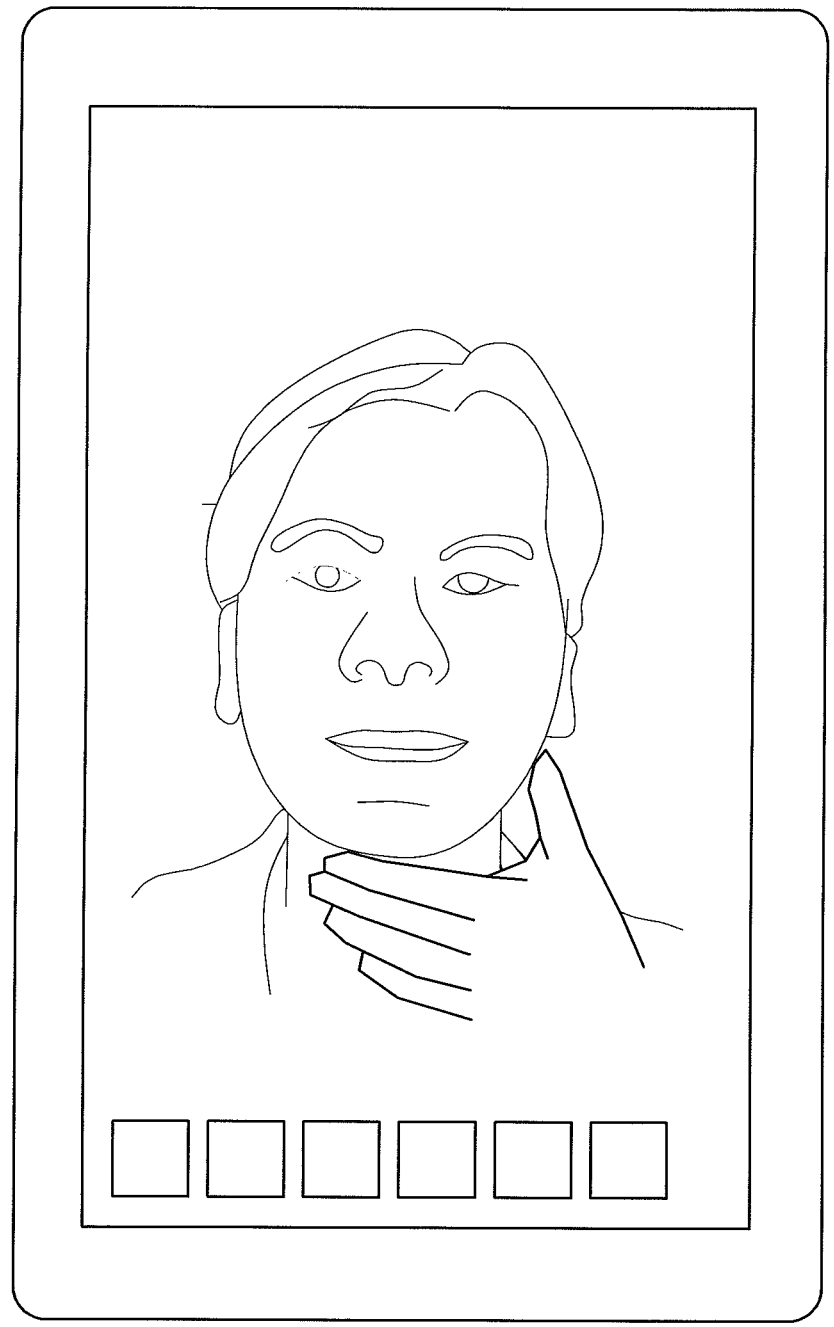
Figure 12C:
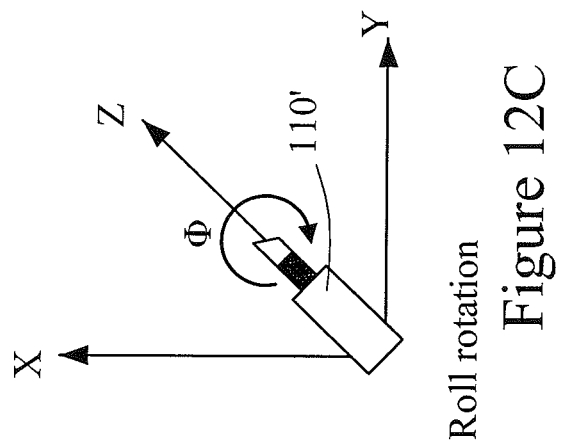
FIGS. 12A~12C shows the object is equipped to provide detection of rotational movements around yaw, pitch, and roll directions.
Figure 12B:
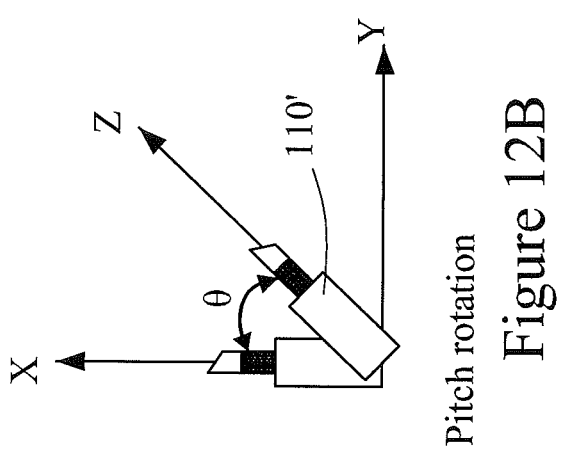

Hereinafter, the operation of how the computing device 120 tracking the object 110 (i.e., the steps of (iii)) will be described. Please refer to FIG. 7 and FIG. 8, FIG. 8 shows the steps of the operation of how the computing device 120 tracking the object 110. First, the step S401 is executed, determining whether the image of the object 110 enter the object tracking window 132b or not, if the image of the object 110 enter the object tracking window 132b the subsequent steps are executed, otherwise the process of tracking the object 110 is not executed (shown as the step S405). After the image of the object 110 enters into the object tracking window 132b, the step S402 is executed, the color features of the object 110 is outputted from the database 126 to the computing device 120, based on that the computing device 120 can split the image of the object 110 and the image of the background, in other words the image of the background is filtered, leaving only the image of the object 110 (shown as FIG. 9). Thus, the computing device 120 will not be interfered with image of the background during tracking the position of the object 110. After, the step S403 is executed, the image of the object 110 is labeled. In the present embodiment, the first section 114 and second section 116 are labeled. Thereafter, the step S404 is executed for pairing the first section 114 and the second section 116. After the above described steps, the computing device 120 can track the object 110 accurately and efficiently. In the step S404, the length L1 of the first section 114 is less than the length L2 of the second section 116, so the second section 116 can be verified as the body section 116, and the first section 114 can be verified as tip, therefore the computing device 120 is able to accurately identify the orientation that the tip of the object 110 indicates in a plane (for example in a x-y plane as shown in FIG. 12B).

Next, please refer to FIG. 1A, FIGS. 10A~10G, FIGS. 10A~10G show the application embodiment of the image-based object tracking system of the present invention. First, refer to FIG. 10A, a user 10 faces the computing device 120, and the display device 130 displays the image of the user captured by the camera 122. In the embodiment, virtual makeup application software is installed in the computing device 120, and the object 110 is used as a controller for the virtual makeup application software. Thereafter, please refer to FIG. 10B, after the completion of step S301 shown in FIG. 7, the augmented reality information can be applied to the face of the user 10, in the embodiment the application software allows the user 10 growing a beard on his face. After the operation of the steps shown in FIG. 8 are completed, the object 110 can be tracked (please refer to FIG. 10C). Then, as shown in FIGS. 10D~10G virtual makeup application software regards the object 110 as a razor, which is used to shave the beard on the user's face.

Figure 11:
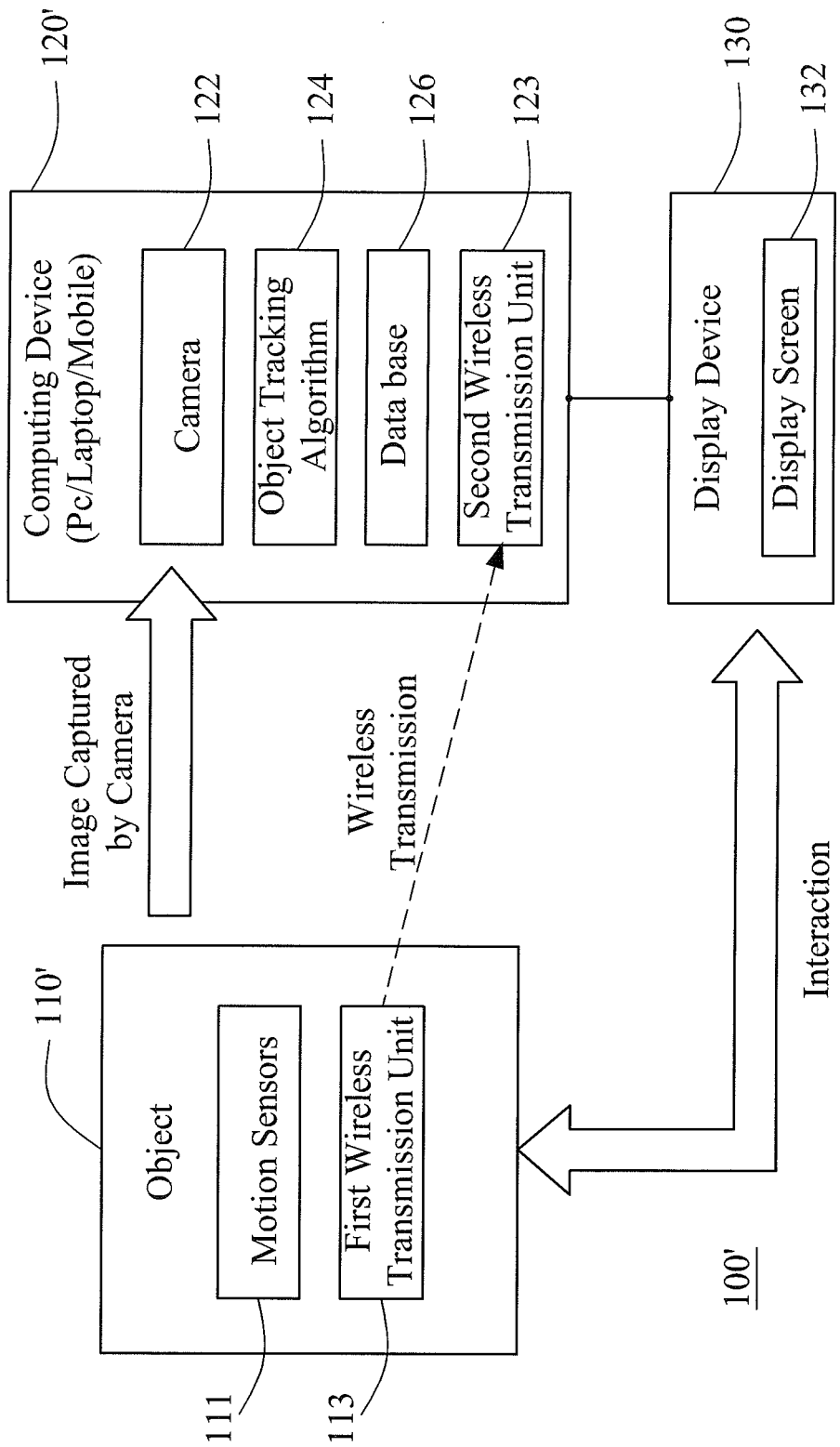
FIG. 11 shows the block diagram of another embodiment of the image-based object tracking system in the present invention.
Figure 12A:
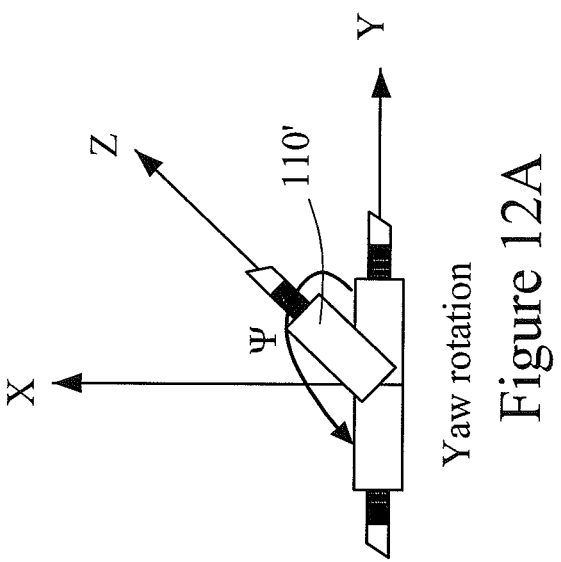

Please refer to FIG. 11, FIG. 11 shows the block diagram of another embodiment of the image-based object tracking system in the present invention. Compared to the image-based object tracking system shown in FIG. 1B, the image-based object tracking system 100' further includes a motion sensor 111, a first wireless transmission unit 113, and a second wireless transmission unit 123. The motion sensor 111 and the first wireless transmission unit 113 are placed in the object 110', the second wireless transmission 123 is placed in the computing unit 120'. In the present embodiment, the motion sensors 111, for example, is an angular velocity sensor, the data generated from the motion sensors 111 can be sent through the first wireless transmission unit 113 to the second wireless transmission unit 123 in the computing device 120', and the computing device 120' can then perform the signal processing. By having the motion sensors 111, the object 110' is equipped to provide detection of rotational movements around yaw, pitch, and roll directions (shown in FIGS. 12A~12C).

What is claimed is:

1. An image-based object tracking system, comprising:
   an object, on a surface of the object is disposed with a color stripe, the color stripe dividing the surface of the object into a first section and a second section;
   a camera, configured to capture real-time images of the object;
   a computing device, an object tracking algorithm is stored in the computing device; and
   a display device, comprising a display screen and electrically connected to the computing device, and the display screen configured to display the real-time images of the object;
   wherein, when the computing device starts the operation of the object tracking algorithm, the computing device performs the following steps:
   (i) checking whether color characteristics of the object stored in a database of the computing device, otherwise starting a step of color learning to store the color characteristics of the object in the database of the computing device;
   (ii) creating an object tracking window; and
   (iii) when the image of the object enters into the object tracking window, tracking the position of the object based on the color characteristics of the object stored in the database;
   wherein the step (iii) comprises:
   based on the color characteristics of the object stored in the database, splitting the image of the object and the image of a background in which the object exists;
   labeling the first section and the second section of the object;
   pairing the first section and the second section; and
   tracking the position of the object.

2. The image-based object tracking system of claim 1, wherein a length of the first section is less than a length of the second section.

3. The image-based object tracking system of claim 1, wherein the surface of the object is rendered in a single color except for the color stripe.

4. The image-based object tracking system of claim 1, wherein in the step (i), the step of color learning comprises:
   showing a color learning window on the display screen;
   moving the object so as to make the image of the object being located in the color window;
   extracting the color characteristics of the object and storing the color characteristics in the database.

5. The image-based object tracking system of claim 1, wherein the step (ii) comprises:
   executing a face tracking step so as to track a user's face; and
   creating an object tracking window, the object tracking window circling the user's face;
   wherein a length and a width of the object tracking window are greater than a length and a width of the user's face, respectively.

6. The image-based object tracking system of claim 2, wherein the step (iii) comprises:
   based on the color characteristics of the object stored in the database, splitting the image of the object and the image of a background in which the object exists;
   labeling the first section and the second section of the object;
   pairing the first section and the second section, so as to verify the second section as a body, and verify the first section as a tip; and
   tracking the position of the object.

7. The image-based object tracking system of claim 1, wherein the object further comprises a motion sensor and a first wireless transmission unit, and the computing device further comprises a second wireless transmission unit, the first wireless transmission unit is configured to transmit data generated by the motion sensor to the second wireless transmission unit.

8. The image-based object tracking system of claim 1, wherein the computing device is a mobile phone, a tablet PC, or a personal computer.

9. An image-based object tracking method, comprising the steps of:
- (a) capturing real-time images of an object by a camera;
- (b) checking whether color characteristics of the object is stored in a database of a computing device, otherwise starting a step of color learning to store the color characteristics of the object in the database of the computing device, wherein a color stripe is disposed on the surface of the object, the color stripe divides the surface of the object into a first section and a second section;
- (c) creating an object tracking window; and
- (d) when the image of the object enters into the object tracking window, tracking the position of the object based on the color characteristics of the object stored in the database;

wherein the step (d) comprises:
- based on the color characteristics of the object stored in the database, splitting the image of the object and the image of a background in which the object exists;
- labeling the first section and the second section of the object, so as to label the second section as a body, and label the first section as a tip;
- pairing the first section and the second section; and
- tracking the position of the object.

10. The image-based object tracking method of claim 9, wherein in the step (b), the step of color learning comprises:
- showing a color learning window;
- moving the object so as to make the image of the object being located in the color window;
- extracting color characteristics of the object and storing the color characteristics in the database.

11. The image-based object tracking method of claim 9, wherein the step (c) comprises:
- executing a face tracking step so as to track a user's face; and
- creating an object tracking window, the object tracking window circling the user's face, and a length and a width of the object tracking window are greater than a length and a width of the user's face, respectively.

12. The image-based object tracking method of claim 9, wherein a length of the first section is less than a length of the second section, and the step (d) comprises:
- based on the color characteristics of the object stored in the database, splitting the image of the object and the image of a background in which the object exists;
- labeling the first section and the second section of the object;
- pairing the first section and the second section, so as to verify the second section as a body, and verify the first section as a tip; and
- tracking the position of the object.

* * * * *